US008875623B2

United States Patent
Smith et al.

(10) Patent No.: US 8,875,623 B2
(45) Date of Patent: Nov. 4, 2014

(54) APPARATUS FOR PRODUCING A PASTA FILATA CHEESE

(75) Inventors: Robert Murray Smith, Beaumaris (AU); Alastair Graeme Sorley, Beaumaris (AU); Mark Wynn Kirkby, Mordialloc (AU)

(73) Assignee: Gold Peg International Pty. Ltd, Moorabbin, Victoria (AU)

( * ) Notice: Subject to any disclaimer, the term of this patent is extended or adjusted under 35 U.S.C. 154(b) by 1532 days.

(21) Appl. No.: 11/662,116

(22) PCT Filed: Sep. 5, 2005

(86) PCT No.: PCT/AU2005/001348
§ 371 (c)(1),
(2), (4) Date: Aug. 7, 2008

(87) PCT Pub. No.: WO2006/026811
PCT Pub. Date: Mar. 16, 2006

(65) Prior Publication Data
US 2009/0117248 A1    May 7, 2009

(30) Foreign Application Priority Data
Sep. 6, 2004   (AU) ................. 2004905084

(51) Int. Cl.
*A01J 11/00* (2006.01)
*A21B 7/00* (2006.01)
*A01J 25/00* (2006.01)
*A23C 19/068* (2006.01)

(52) U.S. Cl.
CPC ........... *A23C 19/0684* (2013.01); *A01J 25/008* (2013.01); *A01J 25/002* (2013.01)

USPC ............................................... 99/456; 99/348

(58) Field of Classification Search
USPC .............................. 99/348, 452–460; 426/582
See application file for complete search history.

(56) References Cited

U.S. PATENT DOCUMENTS 1,639,828 A * 8/1927 Wheeler et al. ............... 426/511
1,796,445 A * 3/1931 Doering et al. ................. 99/330

(Continued)

FOREIGN PATENT DOCUMENTS

DE     3124725 A    2/1983
EP      403137 A   12/1990

(Continued)

OTHER PUBLICATIONS

High Output—No Burning, The Smith Direct Steam Injection Cooking System for All Pumpable Products; Gold Peg Pty Ltd Manual; Victoria, Australia, 1993.

(Continued)

*Primary Examiner* — Dana Ross
*Assistant Examiner* — Lindsey C Teaters
(74) *Attorney, Agent, or Firm* — K&L Gates LLP

(57) ABSTRACT

An apparatus for producing a pasta filata cheese product, such as a Mozzarella-type cheese, in a continuous process without emulsifier or pH regulator additives requires preparing a typical pasta filata-type cheese curd and supplying the curd in cut pieces to one end of a processing chamber (14). The chamber (14) has an agitator (18) which rotates to work, knead, stretch and move the curd through the chamber. At the same time, steam is injected into the curd in the chamber through a plurality of injection nozzles (23) spaced along the length of the chamber (14) to heat and cook the cheese while it is simultaneously mechanically worked. The cooked product exiting from the chamber (14) is molded to a desired shape.

13 Claims, 2 Drawing Sheets

(56) References Cited

U.S. PATENT DOCUMENTS

| | | | |
|---|---|---|---|
| 2,021,899 A | * | 11/1935 | Schneider .................... 426/582 |
| 3,704,006 A | * | 11/1972 | Grout et al. ................... 210/758 |
| 3,713,220 A | * | 1/1973 | Kielsmeier et al. ............. 99/459 |
| 4,112,131 A | | 9/1978 | Bosy et al. |
| 4,898,745 A | | 2/1990 | Zamzow et al. |
| 5,350,595 A | | 9/1994 | Hockenberry et al. |
| 5,655,440 A | * | 8/1997 | Misson ............................ 99/452 |
| 5,902,625 A | | 5/1999 | Barz et al. |
| 6,319,526 B1 | | 11/2001 | Dahlstrom et al. |
| 6,440,481 B1 | | 8/2002 | Gascoigne et al. |
| 2005/0208193 A1 | | 9/2005 | Cortes-Martinez et al. |

FOREIGN PATENT DOCUMENTS

| | | |
|---|---|---|
| EP | 526086 B | 5/1995 |
| EP | 1576886 | 9/2005 |
| GB | 2179731 A | 3/1987 |
| SU | 1752310 A | 8/1992 |
| WO | WO 91/02461 A | 3/1991 |

OTHER PUBLICATIONS

Rota Therm Continuous Cooking System, Steam Fusion Technology; Gold Peg International Pty Ltd. Manual; Victoria, Australia, 2002.

Rota Therm Steam Fusion Technology, Continuous Cooking System; Gold Peg Pty Ltd. Manual, Victoria, Australia, 1998.

Cheese Cooker takes to the world stage; Australian Dairy Foods, J. Dairy Industry Association of Australia (DIAA), Apr. 1993, p. 54., Victoria Australia.

Alfa Laval Launches DSI Cooker, Cheese, Australian Dairy Foods, J. Dairy Industry Association of Australia (DIAA), Aug. 1988, p. 30, Victoria Australia.

Steam Fusion—Continuous Cooking System; Leading Edge Bakery & Food Service Journal, Food Today p. 13, Victoria Australia, 1996.

* cited by examiner

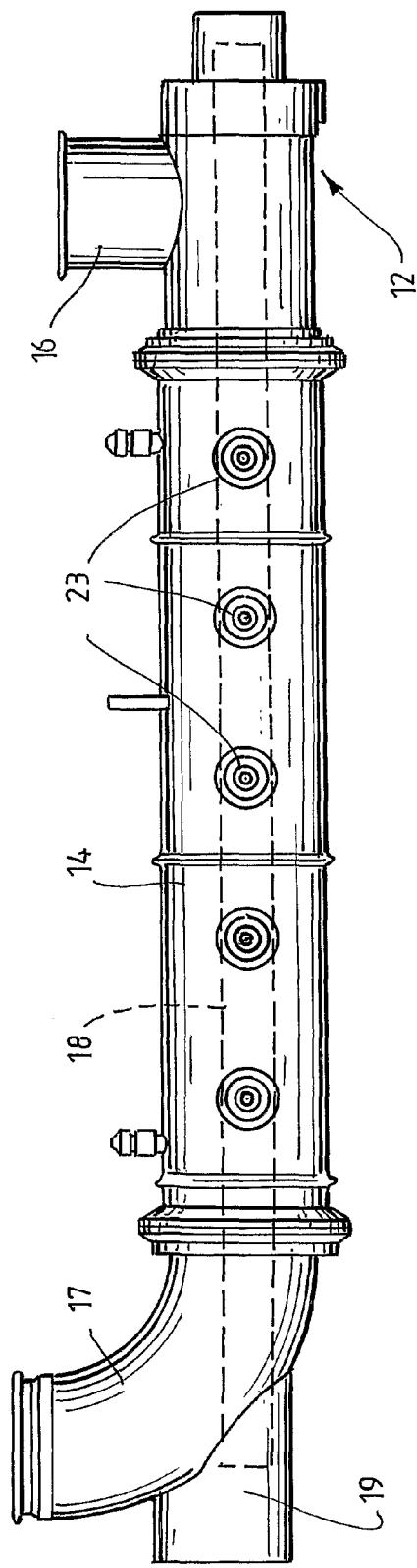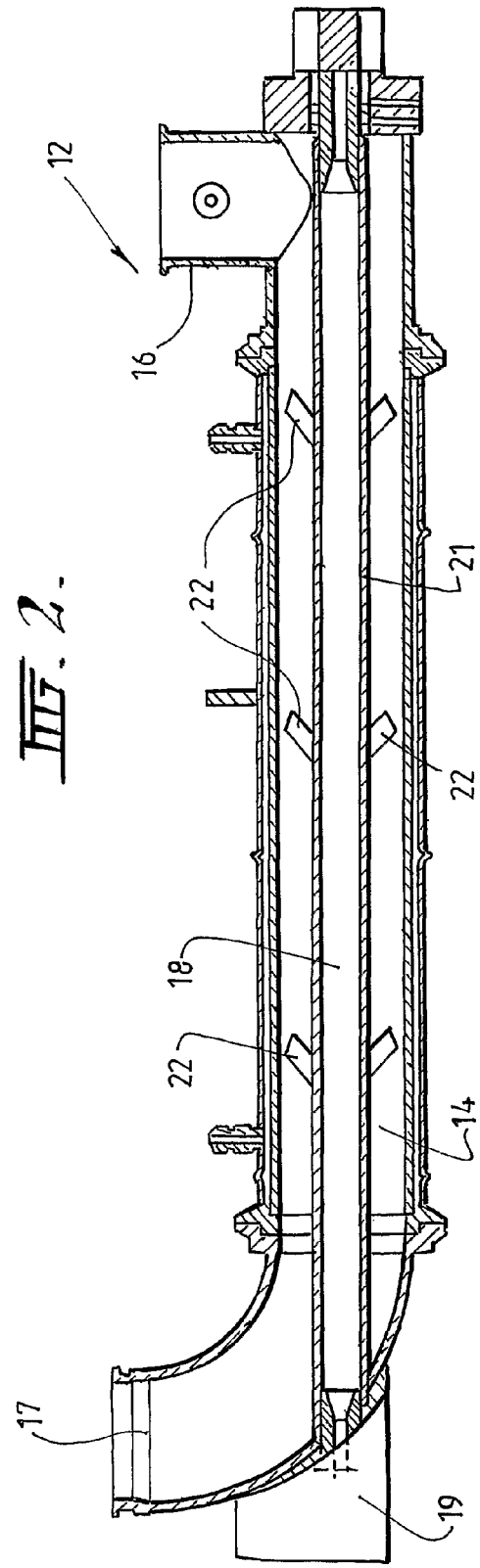

APPARATUS FOR PRODUCING A PASTA FILATA CHEESE

FIELD OF THE INVENTION

This invention relates to a method and apparatus for producing a pasta filata cheese and relates particularly to a method and apparatus for producing such a cheese without added ingredients such as pH regulators or emulsifiers.

BACKGROUND OF THE INVENTION

Pasta filata refers to a type of cheese where curds are heated and stretched or kneaded before being moulded into the desired shape. The resulting product has elasticity, and stretches when cooked or melted. Some of the cheeses in this family include mozzarella, provolone and string.

It is well known to produce a cheese of this type, that is, a cheese having a plastic pliable homogenous stringy structure, using additives which soften casein and thereby improve the elasticity of the end product. In one particular well known process, curd is churned in hot water for a predetermined time to cook the curd, which is then kneaded and stretched to develop the pasta filata cheese. In this process, which may be conducted either as a batch process or as a continuous process, the curd is immersed in the hot water to provide even heating thereof, the water generally being heated directly or indirectly by steam or other means. With this process, however, some fat and soluble protein from the cheese curd tends to be lost from the cheese matrix and combine with the water. Thus, not only is fat and protein lost from the product but the effluent is contaminated with these products.

Further, commonly, the fat and soluble protein in the water burns on the water heat exchanger thereby imparting an undesirable contaminant to the water which then contaminates the cheese product both physically, in the form of small, black particles, and in the taste. The heat exchanger also, therefore, requires regular cleaning, and there is a need to constantly replenish the water.

Still further, the water used in the process dissolves salt from the curd. Thus, the waste water, or effluent, from the process is contaminated with substantial impurities which makes it unsuitable for direct discharge or re-use without treatment to remove the contamination. The waste water must therefore be subject to a relatively expensive reprocessing if the water is to be reused as irrigation water or the like. While fat is often recovered for reuse, the remaining dissolved solids are a major loss to the manufacturing and a major trade waste problem also. In many places, the effluent water constitutes a substantial environmental problem and the reprocessing thereof adds substantially to the total process costs.

DESCRIPTION OF THE PRIOR ART

It has been proposed to manufacture some forms of Pasta Filata cheese using direct steam heating only to cook the curd and thereby avoid the need to immerse the curd in hot water. However, such processes as have been proposed have not successfully produced a pasta filata product without the addition of ingredients such as pH regulators, emulsifiers, food additives, stabilizers, dairy solids, flavor, milk fat, salt and other additives. Further, the products made using such additives and cooked using direct heating by steam have not been consistent in processing quality, and the process has therefore been thought not to be able to be successfully applied to the production of a quality pasta filata cheese product.

It has also been proposed to use apparatus to continuously produce a pasta filata product whereby cheese or curd is heated as it passes through an elongated chamber, the heating being effected by steam injection into the chamber at spaced intervals, and mechanically stirring the mass in the chamber while it is heated. One form of such apparatus is shown in UK patent application GB 2179731A.

However, apparatus of this type has been found to be ineffective in attempts to produce a quality pasta filata product. It is thought that uneven heating of the curd and uneven mechanical stirring of the product in the processing chamber results in an inconsistent and unacceptable pasta filata product.

U.S. Pat. No. 6,319,526 discloses a process for manufacturing a mozzarella variety of cheese, or a mozzarella-like cheese, using a liquid-free environment and mechanically working the heated curd until it forms a fibrous mass. However, in this process, it has been found necessary to add a cheese emulsifying ingredient prior to mechanical working.

U.S. Pat. No. 5,902,625 also discloses a process for manufacturing a cheese product, but, again, it is required that a food additive is added during the process.

Similarly, U.S. Pat. No. 6,440,481 discloses a method of making a pasta filata cheese using typical cheese making equipment and methods. Again, however, the patent requires that various ingredients be added to optimize quality of the pasta filata cheese.

SUMMARY OF THE INVENTION

It is therefore desirable to provide a method to produce a pasta filata cheese product without the need for emulsifiers, pH regulators or other additives.

It is also desirable to provide a method of making a pasta filata cheese product that results in consistent, high quality end product.

It is also desirable to provide a method for making a pasta filata cheese product in a continuous production process.

It is also desirable to provide a method for making a pasta filata cheese which avoids immersion of the curd in hot water or brine and thereby avoids generation of contaminated effluent that requires subsequent re-treatment.

It is also desirable to provide a method of producing a Mozzarella or a Mozzarella-type cheese of high quality using a continuous process without the use of emulsifiers.

It is also desirable to provide an apparatus that is totally enclosed and the product fills the total space.

It is also desirable to provide an apparatus that has a constant forward flow and plug flow through the cooking and stretching apparatus to ensure all product receives the same heat treatment.

It is also desirable to provide a HTST (High Temperature Short Time) system to provide less heat denaturing of the functional components in the product.

It is also desirable to provide an improved method of making a Mozzarella or Mozzarella-type cheese which is economic, and reduces fat and/or protein waste.

It is also desirable to provide apparatus for continuously producing a pasta filata cheese product of high quality and consistency.

It is also desirable to provide apparatus for producing a Mozzarella cheese without the use of emulsifiers, pH regulators or other additives.

In accordance with one aspect of the invention there is provided a method of producing a pasta filata cheese product in a continuous process having the steps of:

preparing a typical pasta filata-type cheese curd without emulsifier or pH regulator additives;

supplying the curd to one end of an elongated processing chamber which contains an axially extending, rotating agitator;

injecting steam at a temperature of between 120° C. and 220° C. into the chamber at a plurality of injection points spaced along the length of the chamber to heat and cook the cheese curd;

maintaining the cooked temperature of the curd such that, adjacent an outlet end of the chamber, the curd is at a temperature of between 50° C. and 90° C.;

simultaneously mechanically working, stirring, kneading and stretching the cheese curd while moving the curd through the chamber from said one end to said outlet end using the rotating agitator by rotating the agitator at a speed of between 10 rpm and 1500 rpm, and receiving the cooked product from the chamber and moulding to desired shape.

The pasta filata cheese curd is preferably formed from a milk composition which is pasteurized and formed into a coagulum. Generally, the coagulum is diced or cut into separate curd pieces, and whey is drained therefrom. The curd maybe reduced in size again after the whey is drained.

In preferred forms of the invention, the curd is then introduced into the inlet of the elongated chamber where it is heated continuously using direct steam injection while being mechanically worked by the rotating agitator until the curd is cooked and formed into a flowable, fibrous mass. When removed from the chamber, the cheese is formed into a selected shape. Salt may be added to the product at various stages in the process, before, during and/or after cooking and stretching, including directly into the curd in the manufacturing stage before cooking and stretching.

Preferably the steam injected into the chamber is at a temperature of between 140 and 190° C., and more preferably between 150 and 180° C. The steam is injected under a pressure of between about 200 to 1200 kPa, and more preferably at a pressure of between 300 and 900 kPa. The product pressure within the chamber may be maintained between 0 and 400 kPa.

In order that the steam injected into the chamber through injection nozzles reaches the inner most part of the cheese curd which is adjacent the shaft, the agitator preferably has an axial shaft diameter of between about 0.2 and 0.8 that of the internal diameter of the chamber.

The cook temperature of the cheese curd is preferably between 55 and 85° C. However, the temperature and the speed of rotation of the agitator may be varied in accordance with the protein and fat content of the curd, product throughput, and the nature of the pasta filata raw material and end product. Most preferably, the end product is a pasta filata style cheese of high quality and consistency with substantial elasticity and an ability to form strings.

Preferably, the steam is injected using a nozzle shape which forms a steam jet to penetrate into the cheese curd rather than wash across the external surface.

By-product streams generated from the manufacturing processes upstream of the continuous heating and stretching stage can be injected into the product stream before or during the heating and stretching stage so that these by-product streams can be re-combined with the product. Such by-products from the manufacturing process include whey streams, fat, soluble protein, salt and lactose. WPC or cultured WPC can also be similarly added at this point during the cooking and stretching process.

According to another aspect of the invention there is provided apparatus for producing a pasta filata cheese product from cheese curd in a continuous process including:

an elongated chamber having an inlet at one end to receive the curd and an outlet at the other end, at least one agitator extending axially through the chamber and adapted to be rotated about its axis to mechanically work, stir, knead and stretch cheese curd within the chamber;

a plurality of steam injector nozzles spaced along the chamber wall and adapted to inject steam directly into the cheese curd within the chamber; and rotating means to rotate the agitator at a selected rotational speed necessary to achieve the desired degree of working, stirring, kneading and stretching of the cheese curd product to impart the desired string, elasticity and other attributes to the product.

Preferably, the agitator includes an axial shaft having a diameter of between about 0.2 and 0.8 that of the internal diameter of the chamber such that the steam injected through the injection nozzles reaches the inner most part of the cheese curd which is adjacent the shaft.

Preferably, multi point steam injection nozzles are provided spaced along the length of the chamber and spaced around its circumference. Thus, the chamber may have, for example, five, or any other number, of injection nozzles aligned along one side extending from the inlet to the outlet and a further five, or any other number, of aligned nozzles diametrically opposed, or in other configurations embodied in the multi point injection apparatus.

The agitator preferably includes a plurality of arms extending outwardly from the agitator shaft and having an end portion extending substantially parallel to the shaft The arms may be mounted in pairs or other configurations along the length of the shaft. Other forms of agitator design that mixing/working of the steam and curd may be used in the performance of the invention.

The diameter of the agitator shaft may be relatively important in an agitator design as this defines the size of the annulus between the outer surface of the shaft and the inner surface of the chamber in which the cheese curd is contained. The diametrical thickness of the annulus and the pressure of steam supplied to the steam nozzles is chosen so that the injected steam passes through the cheese curd to the inner most portion thereof ensuring that all the cheese curd is evenly heated and cooked.

In order that the invention is more readily understood, embodiments thereof will now be described with the references to the accompanying drawings.

DESCRIPTION OF THE DRAWINGS

FIG. 1 is a side elevational view of a continuous cooking chamber in accordance with one embodiment of the invention.

FIG. 2 is a cross sectional side elevational view of the cooking chamber of FIG. 1.

DESCRIPTION OF THE PREFERRED EMBODIMENTS

Figure 3:
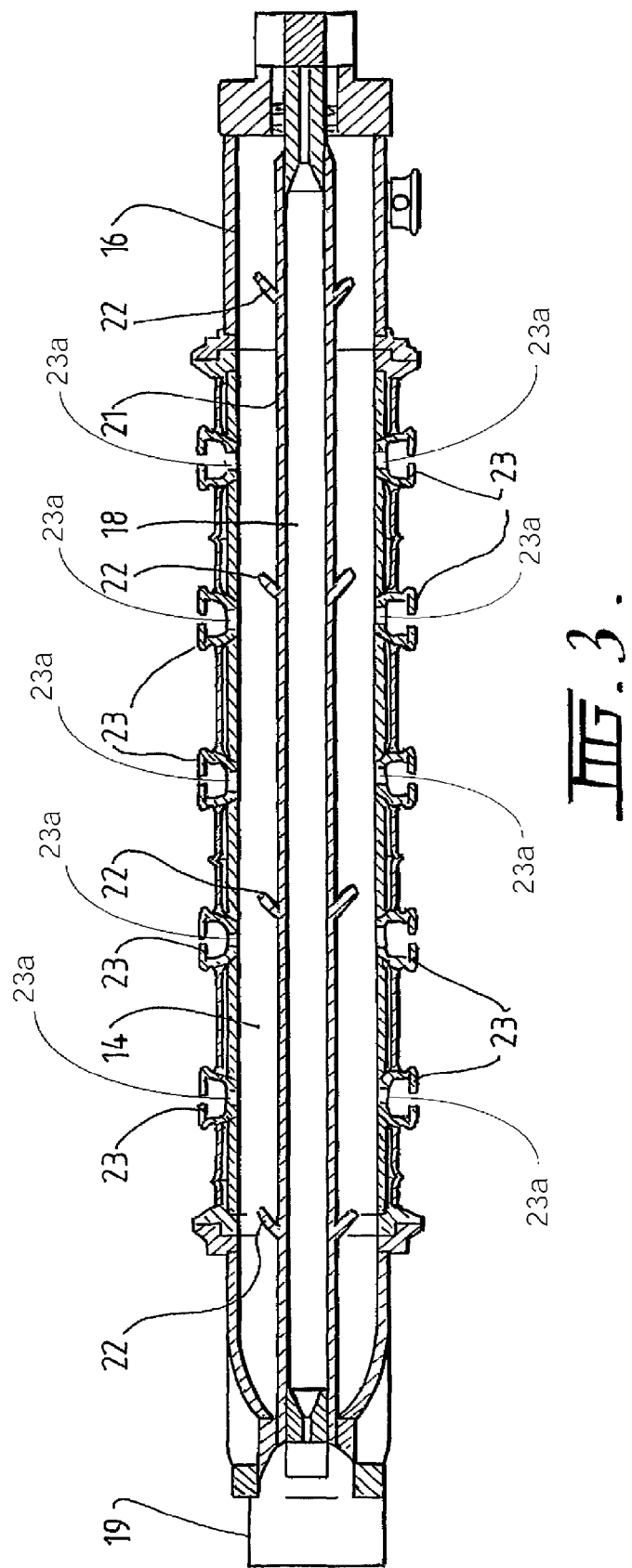
FIG. 3 is a cross sectional plan view of the cooking chamber of FIG. 1.

Referring to the drawings, a continuous cooker (12) of the type sold under the Trade Mark RotaTherm®, comprises an elongated cooking chamber (14) having an inlet (16) at one end and an outlet (17) at the other end.

The cooker (12) has an axially extending internal agitator (18) rotated by a drive mechanism, shown generally at (19), which may include an electric motor, a hydraulic motor or other means for rotating the agitator (18) at a variable speed chosen for the particular task. The drive mechanism (19) may be located at either end of the cooker (12).

The agitator (18) includes an internal shaft (21) which, in the illustrated embodiment, has an outer diameter that is approximately 0.2 to 0.8 of the internal diameter of the cooking chamber (14). The diameter of the shaft (21) is chosen to ensure that the cheese curd is evenly heated and cooked, as hereinafter described.

A plurality of agitator arms (22) extend outwardly from the shaft 21, the arms having outer ends extending towards the inlet or outlet end thereof. In the embodiment illustrated, seven pairs of arms are shown in FIGS. 2 and 3, the arms being sized and shaped to stir, knead, stretch and move cheese curd located within the chamber (14). The arms (22) may take a variety of different forms and shapes to properly knead, stir, stretch and move the cheese curd through the chamber (14).

Although a single agitator is illustrated in this embodiment, it will be appreciated that in other embodiments of the invention, two or more agitators (not shown), may be used in the chamber (14) to stir, knead, stretch and move cheese curd located within the chamber (14).

A plurality of steam injection nozzles (23) extend along each side of the chamber (14), there being ten nozzles illustrated in the embodiment described. The steam injection nozzles (23) are adapted to receive steam under pressure of between 200 and 1200 kPa, and preferably between 300 and 900 kPa. The steam injection nozzles (23) include respective openings (23a) into the chamber (14). The steam temperature is preferably between 130 and 200° C. and more particularly between 150 and 180° C. The steam injection nozzles are constructed so that, when cheese curd is located within the chamber (14), the injected steam will penetrate into the cheese curd to the inner most portion thereof adjacent the shaft (21). Thus, the nozzles are designed to focus the steam jet in a way that the steam does not wash over the outside of the curd but instead penetrates into the curd. As indicated above, the diameter of the shaft (21) is chosen to assist the steam penetration.

In the embodiment described herein, the cooker (12) as described above is used in the process of manufacturing a pasta filata variety of cheese, or a Mozzarella-like cheese in a continuous process. The process includes taking a milk composition having the required fat and protein content and pasteurizing the composition and forming it into a coagulum. The coagulum is cut into separate curd pieces, and the whey is drained from the curd pieces after which the curd size may be reduced.

The curd pieces are fed into the inlet (16) of the chamber (14) at a rate of between about 40-10,000 kg/hr and into the chamber where it is heated using the direct steam injection referred to above while being mechanically worked by rotation of the agitator (18) at a predetermined speed, which is selected according to the nature of and quality of the cheese product desired. The combination of the heating and working forms a fibrous, elastic cheese material without the need to add ingredients such as emulsifiers, pH regulators or other ingredients. However, it may be desirable in preparing the curd, to add dry milk, protein concentrate or other dietary additives to produce the desired form of pasta Filata cheese.

During the cooking process, the cook temperature is maintained at between about 50 and 90° C. and preferably between about 55 and 82° C. The steam is supplied at a temperature of between about 130 and 200° C. and more preferably between about 150 and 180° C. The pressure within the cooking chamber (14) may be maintained at between 0 and 400 kPa while the agitator is rotated at anywhere between about 10 and 1500 rpm. The speed of rotation of the agitator may be varied in accordance with the desired parameters of the finished Mozzarella product and the nature of the curd starting material.

The time that the cheese curd remains in the cooking chamber (14) will also vary depending on the pump speed supplying the product to the cooker and the temperature of the steam injected into the cheese curd, the agitator speed and the time needed for complete cooking, and is adjusted accordingly, such as by varying the agitator rotational speed. Such time within the chamber may range from between 5 seconds to 5 minutes.

EXAMPLE

A milk composition having a selected protein and fat composition is pasteurized, and a coagulum is formed therefrom, in a known manner. The coagulum is diced or cut so as to separate the whey, which is conveyed away, although a portion thereof may subsequently re-used. The cheese curd pieces are fed by a pump to the inlet (16) of the cooking chamber (12) where it is mechanically stirred, kneaded, heated and cooked. A small amount of whey and salt by product may be added at the cooking chamber, the cooking chamber inlet or before the cooking chamber. (16).

In this example, steam is supplied to the ten steam nozzles (23) at a pressure of about 600 kPa and a temperature of about 170° C. The agitator (18) is rotated by a variable speed electric motor at a speed of about 400 RPM. The agitator shaft diameter is about 0.3 times the inner diameter of the chamber (14), and the cheese curd product spends about 30 seconds passing through the chamber (14) to the outlet (17). The average cooking temperature of the cheese curd product is about 55 to 70° C.

The cooked product coming from the outlet (17) is conveyed to a moulding station where it is shaped by moulds and cooled to retain its shape. The product can be cooked and stretched soley on the RotaTherm cooking system or a secondary working (auger kneading) section can be used to provide extra work to the mozzarella after the product has left the cooking chamber and before the moulding station. The product exhibits excellent string and elasticity characteristics equivalent to those of a quality Mozzarella cheese.

By processing a cheese curd in the manner described, and preferably using the apparatus described, a pasta filata type cheese product is able to be produced without the use of additives such as emulsifiers, pH modifiers or regulators and other similar additives. The output product is of high quality and consistency and is able to be made with minimal or no production of contaminated waste water, and without the loss of fat or protein or salt from the curd due to washing. The process provides higher product yields through the reduction or prevention of these losses in the cooking process. The process obviates the need for water heating using a heat exchanger or the like and the accompanying need for cleaning such a heat exchanger. The process avoids contamination of the pasta filata product by burnt material that might otherwise form on a water heat exchanger, and the ability to vary to process conditions in accordance with the nature of the starting curd material and the desired cheese product to be produced ensures that the desired quality of the end product is able to be maintained.

All by-products from the process, such as whey streams, fat, salt, soluble protein and lactose can be incorporated into the process prior to or at the cooking stage. The process is flexible and able to take account of differences in milk compositions as well as different output requirements.

The invention claimed is:

1. An apparatus for producing a pasta filata cheese product from cheese curd in a continuous process comprising:
an elongated chamber having a chamber wall, a first end, a second end, an inlet at the first end to receive the curd, an outlet at the second end, and at least one agitator extending through the chamber;
a plurality of steam injector nozzles spaced along the chamber wall, each steam injector nozzle having a respective opening into the elongated chamber, and adapted to inject steam directly into the cheese curd within the elongated chamber; and
rotating means operably engaged with the at least one agitator to rotate the at least one agitator at a selected rotational speed, wherein
the agitator includes an axial shaft, wherein the axial shaft has a diameter of between about 20% and 80% of the internal diameter of the elongated chamber, and wherein the steam injected through the injection nozzles is configured to reach the inner most part of the cheese curd which is adjacent the shaft.

2. The apparatus according to claim 1 wherein multi point steam injection nozzles are provided spaced along the length of the chamber and spaced around its circumference.

3. The apparatus according to claim 1 wherein the chamber has five or more injection nozzles aligned along one side extending from the inlet to the outlet and a further number of aligned nozzles diametrically opposed or otherwise in another spaced configuration of nozzles.

4. The apparatus according to claim 1 wherein the agitator includes a plurality of arms extending outwardly from the agitator shaft and the arms having an end portion extending substantially towards the inlet end of the chamber.

5. The apparatus according to claim 4 wherein the arms are mounted on the shaft in opposed pairs or other combinations and extend along the length of the shaft.

6. The apparatus according to claim 1 wherein the rotating means comprises an electric motor or a hydraulic motor drivingly connected to the agitator.

7. The apparatus of claim 1, wherein the axial shaft has a diameter of 30% of that of the internal diameter of the chamber.

8. The apparatus of claim 1, wherein the axial shaft has a diameter of between 30% and 80% of the internal diameter of the elongated chamber.

9. An apparatus for producing a pasta filata cheese product in a continuous process comprising:
an elongated chamber having a chamber wall, a first end, a second end, an inlet at the first end to receive a cheese curd, an outlet at the second end, and at least one agitator extending through the chamber and adapted to be rotated within the chamber and move the cheese curd within the chamber;
a plurality of pressurized steam injector nozzles spaced along the chamber wall, each pressurized steam injector nozzle having a respective opening into the elongated chamber, wherein each pressurized steam injector nozzle is configured to inject pressurized steam into the elongated channel; and
a motor operably engaged with the at least one agitator, wherein
the at least one agitator comprises an axial shaft, wherein the axial shaft has a diameter of between about 20% and 80% of the internal diameter of the elongated chamber, and wherein the diameter of the axial shaft in relation to the diameter of the internal diameter of the elongated chamber is configured to correspond to the pressure of the pressurized steam to facilitate the pressurized steam in penetrating the inner most part of the cheese curd which is adjacent the axial shaft.

10. The apparatus of claim 9, wherein the axial shaft has a diameter of between 30% and 80% of the internal diameter of the elongated chamber.

11. A steam injected heating apparatus for producing a pasta filata cheese product in a continuous process, comprising:
an elongated chamber having a chamber wall, a first end, a second end, an inlet at the first end to receive a cheese curd, an outlet at the second end, and at least one agitator extending through the chamber and adapted to be rotated within the chamber and move the cheese curd within the chamber;
a plurality of steam injector nozzles spaced along the chamber wall, each steam injector nozzle having a respective opening into the elongated chamber; and
a motor operably engaged with the at least one agitator, wherein
the at least one agitator comprises an axial shaft, wherein the axial shaft has a diameter of between about 30% and 80% of the internal diameter of the elongated chamber, wherein the diameter of the axial shaft defines an annulus between an outer surface of the axial shaft and an inner surface of the elongated chamber, and wherein the steam injector nozzles are configured to inject the steam to transverse the annulus and penetrate the inner most part of the cheese curd which is adjacent the shaft.

12. The steam injected heating apparatus of claim 11, wherein the axial shaft comprises a uniform diameter, and wherein the uniform diameter of the axial shaft is configured to permit the steam injected heating apparatus to uniformly cook the cheese curd.

13. A steam injected heating apparatus for producing a pasta filata cheese product in a continuous process, comprising:
an elongated chamber having a chamber wall, a first end, a second end, an inlet at the first end to receive a cheese curd, an outlet at the second end, and at least one agitator extending through the chamber and adapted to be rotated within the chamber and move the cheese curd within the chamber;
a plurality of steam penetrating injector nozzles spaced along the chamber wall, each steam penetrating injector nozzle comprising a respective opening into the elongated chamber, and configured to inject steam to penetrate the cheese curd within the elongated chamber;
rotating means operably engaged with the at least one agitator to rotate the at least one agitator at a selected rotational speed, wherein
the agitator includes an axial shaft, wherein the axial shaft has a diameter of between about 30% and 80% of the internal diameter of the elongated chamber; and
means for injecting steam through the steam penetrating injection nozzles to penetrate the inner most part of the cheese curd adjacent the shaft.

* * * * *